3,346,506
HYDROGEN-GENERATING COMPOSITION
AND USE
Oscar Francis Beumel, Jr., West Chester, Pa., assignor to
Foote Mineral Company, Exton, Pa., a corporation
of Pennsylvania
No Drawing. Filed Oct. 14, 1963, Ser. No. 317,101
16 Claims. (Cl. 252—188)

ABSTRACT OF THE DISCLOSURE

Lithium hydride is mixed with a defined inert, non-solvent, non-aqueous organic liquid to provide a stable, non-caking composition which generates hydrogen upon being dispersed in water.

---

The present invention relates to a novel composition for generating hydrogen gas and to a method for generating hydrogen gas with such composition; and, more particularly, the present invention relates to an improved hydrogen-generating composition containing lithium hydride.

Lithium hydride (LiH) powder has been used to generate hydrogen gas by reaction with water, for example as a means for filling distress signal balloons at sea. However, as has been noted, the reaction, and hence rate of hydrogen generation, has been difficult to control. Thus, freshly prepared and extremely fine lithium hydride reacts extremely rapidly. On the other hand, if the lithium hydride composition has been permitted to stand, as in storage or in a survival kit, it tends to react slowly with moisture gaining access to it whereby the particles become coated with lithium hydroxide. This coating impedes the ultimate desired reaction. Powdered lithium hydride also tends to compact and cake readily under high pressures particularly under the influence of moisture, and this limits its use under water as, for example, a means for blowing water from ballast tanks or pontoons used to raise sunken ships or for sending distress—or marker buoys to the surface by divers.

It is, therefore, the principal object of the present invention to provide a novel lithium hydride-containing composition which can be used to generate hydrogen in a controlled manner.

Another object of the present invention is to provide a lithium hydride-containing composition which will generate hydrogen gas, upon contact with water, in a rapid yet controlled manner.

A further object of the present invention is to provide a lithium hydride-containing composition which will not, even under conditions of high pressure, become compacted into a cake difficult to disperse in water for reaction therewith.

Other objects, including an improved method of generating hydrogen gas, will become apparent from a consideration of the following specification and claims.

The composition of the present invention consists essentially of lithium hydride particles surrounded by a non-aqueous organic liquid, which is inert to lithium hydride and in which lithium hydride is insoluble, at least the major portion of said liquid being one which is soluble in water.

Depending upon the relative proportions of lithium hydride particles and non-aqueous organic liquid, the composition of the present invention may range in consistency from a paste to a pourable slurry. In any event, the lithium hydride particles will be coated with, and hence separated from each other by, a film of the stated organic liquid. This effectively prevents premature reaction between the surface of the lithium hydride particles and moisture, and caking. Thus, the composition remains as an easily handleable particulate mass, readily dispersable in water when it is desired to generate hydrogen. The organic liquid may be used in sufficient amount to fill all interstices between the lithium hydride particles rendering the composition incompressible and, therefore, readily mechanically manipulatable and dispersable in water even under the great water pressures found at several thousand feet depth. Moreover, by the present invention, by suitable choice of organic liquid, and combinations thereof and of particle size of the lithium hydride, the rate of reaction of the lithium hydride-containing composition with water can readily be controlled to suit the requirements of any particular situation, from extremely rapid rates for emergencies to a more gentle rate for non-emergency uses.

Referring more particularly to the non-aqueous organic liquid, it should, as stated, be inert to, that is, non-reactive with, lithium hydride and be one in which lithium hydride is insoluble. However, at least the major portion of the organic liquid should be soluble in—or miscible with—water (including sea water) so that when it is desired to generate hydrogen gas, the present composition need only be mixed with water which removes or penetrates the non-aqueous organic liquid and reacts with the lithium hydride. Water-soluble organic liquids particularly suitable are pyridine and ethers, like tetrahydrofuran, dioxane and the liquid glycol ethers, especially those having the formula RO—(CH$_2$—CH$_2$—O)$_n$—R where R is an alkyl group containing from 1 to 3 carbon atoms (methyl, ethyl, n-propyl, isopropyl and the like) where $n$ is an integer selected from 1, 2 and 3, and where the total number of carbon atoms in the ether does not exceed 8. Examples of such glycol ethers are ethylene glycol dimethyl ether, diethylene glycol dimethyl ether, diethylene glycol diethyl ether, diethylene glycol di-n-propyl ether, triethylene glycol dimethyl ether, and the like. Of these, diethylene glycol diethyl ether is especially suitable. Where necessary the freezing point of the organic liquid can be lowered since it is preferred that the organic liquid phase have a freezing point below 32° F. For example dioxane freezes at 53° F., and the freezing point thereof can be lowered by mixing therewith a small amount of another liquid having a lower freezing point. In this connection, tetrahydrofuran and diethylene glycol diethyl ether freeze well below 32° F. As will be apparent, the organic liquid phase should not boil at atmospheric conditions of temperature and pressure.

The foregoing liquids are all highly soluble in water. As stated previously, one of the advantageous features of the present invention is the ability to control the rate of reaction of the lithium hydride in the composition with water. One way this can be achieved is through incorporation, with the water-soluble organic liquid, of a non-aqueous organic liquid, which is relatively insoluble in water, that is having limited—or even no solubility in water, but which is compatible with the water-soluble liquid and, of course, inert to lithium hydride and in which lithium hydride is insoluble. Examples of such organic liquids having limited or no water-solubility are aliphatic hydrocarbons, like hexane, kerosene, gasoline, mineral oil, and the like, and aromatic hydrocarbons, like benzene, toluene, xylene, and the like. Since the organic liquid of limited- or no-water solubility is used, when desired, to control the rate of reaction and since ultimate reaction of the lithium hydride with water is desired, in any event, the amount of water-soluble organic liquid will always be in excess of that of the organic liquid having limited- or no-solubility in water.

Some control of the reaction rate can also be achieved by controlling the particle size of the lithium hydride, since the finer the particle size the greater the reaction rate. On the other hand, when all the lithium hydride is extremely fine, as all through 140 mesh, it tends to pack under high pressure when the organic liquid content is in the lower end of the range hereinafter discussed. In general, the lithium hydride employed will be such that substantially all thereof passes through an 8 mesh screen, with the finest fraction passing through 180 mesh and being substantially retained on 200 mesh.

The provision of any desired particle size distribution will present no problem since the lithium hydride can simply be ground in conventional equipment. Grinding preferably takes place out of contact with moisture, as under an inert, moisture-free atmosphere of nitrogen or argon. When large amounts of lithium hydride are being handled, dry grinding under a dehumidified air atmosphere may be satisfactory as any reaction taking place between the lithium hydride and moisture will be negligible.

Reference has previously been made herein to variations in the relative proportions of lithium hydride and non-aqueous organic liquid. The minimum proportion of organic liquid is that required to just coat each particle of lithium hydride to provide a protective barrier or film surrounding the particles. For this purpose, the organic liquid may be present in an amount as low as about 10%, by weight, the lithium hydride making up the balance—up to 90%. This would provide a thick paste that can be extruded or ejected into water from a gas-generating device. Under conditions of high pressure, however, as in devices suitable for generating hydrogen gas at great depths undersea, the amount of organic liquid employed should also fill all spaces between the lithium hydride particles so that, in effect, the composition is an incompressible liquid with the lithium hydride particles suspended therein. The minimum proportion of organic liquid for this purpose is about 30%, by weight, based on the combined weight of lithium hydride and organic liquid. Of course, larger proportions of organic liquid may be used to provide slurries of different consistencies to suit special conditions. A readily pumpable slurry can be provided at concentrations of lithium hydride of between about 40 and about 60%, by weight. No advantage is to be gained by going to lithium hydride concentrations below about 40%, especially since the greater the proportion of organic liquid the less the amount of hydrogen that can be generated per unit weight of composition. In fact, since lithium hydride is very light it will in time rise in a relatively dilute composition to form a lithium hydride-rich layer containing at least about 50%, by weight, of lithium hydride.

In preparing the composition of the present invention, the lithium hydride is simply mixed with the non-aqueous organic liquid, and any conventional solid-liquid mixing device may be used for this purpose.

In generating hydrogen gas with the composition of the present invention, the composition is simply mixed with water in an amount at least stoichiometrically equivalent to the lithium hydride to react according to the equation $LiH + H_2O \rightarrow LiOH + H_2$. Of course, the reaction will take place in a suitable apparatus adapted to utilize the gas generated, and this may simply be a buoy, balloon, submerged pontoon or ballast tank containing water or the like, or another device in gas-flow communication therewith.

The following examples are given for the purpose of illustration only and are not intended to limit the scope of the invention in any way.

*Examples I–XI*

Eleven compositions are prepared containing 40–50%, by weight, of lithium hydride and 50–60%, by weight, of diethylene glycol diethyl ether. The lithium hydride differed in each composition according to particle size. One gram samples of each composition are then added to an excess of water and the period of gas (hydrogen) evolution is timed. The results are as follows:

TABLE I

| Composition | LiH Particle Size (Mesh) | | Gas Evolution (Seconds) |
|---|---|---|---|
| | Through | On | |
| I | 8 | 10 | 30 |
| II | 10 | 20 | 22 |
| III | 20 | 30 | 10 |
| IV | 30 | 40 | 7 |
| V | 40 | 50 | 5 |
| VI | 50 | 60 | 4 |
| VII | 60 | 80 | 3.5 |
| VIII | 80 | 100 | 3 |
| IX | 100 | 120 | 3 |
| X | 120 | 140 | 3 |
| XI | 140 | 160 | 1 2.5 |

1 Tendency to cake.

*Examples XII–XXI*

Various lithium hydride-containing compositions are prepared and tested for hydrogen gas-generation under varying degrees of pressure. The compositions all contain 60% by weight, of lithium hydride, the balance being diethylene glycol diethyl ether. The lithium hydride differs as to particle size as noted in the following table. Each composition (containing 3 g. of lithium hydride) is held in a cylinder and placed in an autoclave over an open container of water (420 ml.). After the autoclave is closed, an atmosphere of argon gas is produced at a pressure as set forth in the following table. Then the lithium hydride-composition is ejected from the cylinder into the water and the pressure increase and time are recorded to a constant peak as set forth in the following table:

TABLE II

| Composition | LiH Particle Size (Mesh) | | Argon Pressure (p.s.i.) | Peak Pressure (p.s.i.) | Time (Secs.) |
|---|---|---|---|---|---|
| | Through | On | | | |
| XII | 35 | | 200 | 370 | 35 |
| XIII | 35 | | 500 | 700 | 21 |
| XIV | 100 | | 600 | 805 | 24 |
| XV | 35 | 100 | 600 | 750 | 15 |
| XVI | 40 | 50 | 300 | 510 | 8 |
| XVII | 100 | | 300 | 470 | 30 |
| XVIII | 40 | 50 | 600 | 800 | 6 |
| XIX | 40 | 50 | 900 | 1,180 | 9 |
| XX | 100 | | 900 | 1,080 | 24 |
| XXI | 35 | 100 | 1,500 | 1,800 | 5 |

*Examples XXII–XXXII*

These examples are conducted as in Examples XII–XXI except that different amounts of lithium hydride and of water are used as noted in the following Table III. In addition, composition XXXII contains 56% LiH. In compositions XXII–XXVI the lithium hydride has a particle size through 40 and on 50, and in the remaining examples the particle size is through 35 and on 100. The results are as follows:

TABLE III

| Composition | LiH (gs.) | Water (ml.) | Argon Pressure (p.s.i.) | Peak Pressure (p.s.i.) | Time (secs.) |
|---|---|---|---|---|---|
| XXII | 12 | 420 | 400 | 1,150 | 6 |
| XXIII | 8 | 420 | 400 | 890 | 12 |
| XXIV | 4 | 420 | 400 | 670 | 6 |
| XXV | 2 | 420 | 400 | 550 | 6 |
| XXVI | 4 | 420 | 1,000 | 1,250 | 25 |
| XXVII | 3 | 520 | 900 | 1,140 | 6 |
| XXVIII | 4 | 420 | 1,000 | 1,300 | 7 |
| XXIX | 4 | 420 | 1,500 | 1,800 | 14 |
| XXX | 3.5 | 420 | 2,000 | 2,450 | 8 |
| XXXI | 3.75 | 700 | 2,000 | 2,900 | 20 |
| XXXII | 3 | 700 | 2,000 | 2,900 | 20 |

Modification is possible in the selection of organic liquid and in the proportion and size of lithium hydride without departing from the scope of the invention.

I claim:

1. A hydrogen gas-generating composition consisting essentially of lithium hydride particles surrounded by a non-aqueous organic liquid which is inert to lithium hydride and in which lithium hydride is insoluble, selected from the group consisting of pyridine, tetrahydrofuran, dioxane and liquid glycol ethers and mixtures of at least one of these with a liquid hydrocarbon in which the former is in excess, the concentration of said lithium hydride being between about 40% and about 90%, by weight, based on the weight of said composition.

2. The composition of claim 1 wherein the concentration of lithium hydride is between about 50% and about 70%, by weight, based on the weight of said composition.

3. The composition of claim 1 wherein said non-aqueous organic liquid comprises pyridine.

4. The composition of claim 1 wherein said non-aqueous organic liquid comprises tetrahydrofuran.

5. The composition of claim 1 wherein said non-aqueous organic liquid comprises dioxane.

6. The composition of claim 1 wherein said non-aqueous organic liquid comprises a glycol ether having the formula RO—$(CH_2—CH_2—O)_n$—R, where R is an alkyl group containing from 1 to 3 carbon atoms, where $n$ is an integer selected from the group consisting of 1, 2 and 3, and where the total number of carbon atoms in the ether does not exceed 8.

7. The composition of claim 6 wherein said glycol ether is diethylene glycol diethyl ether.

8. The composition of claim 1 wherein the particle size of said lithium hydride is such that substantially all thereof passes through an 8 mesh screen.

9. The composition of claim 8 wherein the particle size distribution of said lithium hydride is such that substantially all of the most coarse fraction passes through an 8 mesh screen and substantially all of the finest fraction passes through a 180 mesh screen but is retained on a 200 mesh screen.

10. The composition of claim 1 wherein said non-aqueous organic liquid is one of said mixtures with a hydrocarbon.

11. The method of generating hydrogen gas which comprises contacting, with water, a composition consisting essentially of lithium hydride particles surrounded by a non-aqueous organic liquid which is inert to lithium hydride and in which lithium hydride is insoluble, selected from the group consisting of pyridine, tetrahydrofuran, dioxane and liquid glycol ethers and mixtures of at least one of these with a liquid hydrocarbon in which the former is in excess, the concentration of said lithium hydride being between about 40% and about 90%, by weight, based on the weight of said composition.

12. The method of claim 11 wherein the concentration of lithium hydride particles surrounded by said non-aqueous organic liquid in said composition is between about 50% and about 70%, by weight, based on the weight of said composition.

13. The method of claim 12 wherein substantially all of said non-aqueous organic liquid is tetrahydrofuran.

14. The method of claim 12 wherein substantially all of said non-aqueous organic liquid is dioxane.

15. The method of claim 12 wherein substantially all of said non-aqueous organic liquid is a glycol ether having the formula RO—$(CH_2—CH_2—O)_n$—R, where R is an alkyl group containing from 1 to 3 carbon atoms, where $n$ is an integer selected from the group consisting of 1, 2 and 3, and where the total number of carbon atoms in the ether does not exceed 8.

16. The method of claim 15 wherein said glycol ether is diethylene glycol diethyl ether.

References Cited

UNITED STATES PATENTS 3,166,514   1/1965   Parshall _____ 252—188

OTHER REFERENCES

Laidler: Lithium and its Compounds, The Royal Institute of Chemistry, London, 1957, p. 22.

LEON D. ROSDOL, *Primary Examiner.*

S. D. SCHWARTZ, *Assistant Examiner.*